United States Patent Office 2,781,274
Patented Feb. 12, 1957

2,781,274

REINFORCED INORGANIC MOLDED PRODUCTS

Games Slayter, Newark, Ohio, assignor to Owens-Corning Fiberglas Corporation, a corporation of Delaware No Drawing. Application April 28, 1951, Serial No. 223,660

15 Claims. (Cl. 106—108)

This invention relates to the manufacture of inorganic molding compositions and to products molded therefrom.

The technique of molding structural products, to the present, has been confined almost exclusively to compositions based upon the use, as the binder, of organic resinous material capable of plastic flow under molding conditions. Because of the dominant role of the organic binder and the limited temperature stability of such organic materials, use of products molded thereof have been limited to environments where the temperatures will never exceed 300° F. and will seldom reach 250° F. and where the molded product will not be exposed to direct flame. Obviously there are many applications where it is desirable to make use of a molded product but such organic molded products are unsuitable. There has been a need for a molding material which can be formed into molded products capable of withstanding continuous exposure at temperatures in excess of 250° F. or exposure to direct flame without having to rely upon expensive metals and the like.

Numerous attempts have been made to formulate molding compositions which were primarily compounded of inorganic materials but for many reasons these attempts have failed. One reason is the lack of strength and, when reinforcement is incorporated to impart greater strength, the compound became so stiff as to retard flow whereby it became more difficult properly to fill the mold even under high pressure.

It is an object of this invention to produce and to provide a method for producing an inorganic composition capable of molding under heat and pressure to form a high strength, low cost product and it is a related object to produce a product of the type described reinforced with glass fibers.

Another object is to produce a thermosetting molding composition compounded of low cost inorganic materials and capable of molding by conventional means to form a high strength product of predetermined shape which is capable of exposure at temperatures of 250° F. or higher without deterioration and which is flameproof.

A further object is to produce a molding composition of the type described formed of low cost and readily available materials which can be combined by simple and expedient means into a molded product having the advantages of the type described.

In my copending application filed on this same date, description therein is made of an inorganic molding compound formulated of magnesium oxide and a hydrated magnesium sulphate which liberates water of crystallization at elevated temperatures of molding temporarily to introduce flowability for filling the mold until the compound reacts to set conditions to form what is believed to be a product similar to that of magnesium oxysulphate cements. Since no water or other fluidizing agent is added to the composition of the type described and claimed in my copending application, reliance is had entirely on water liberated from the hydrated salt. As a result, the compound is intolerant of fillers or reinforcement, such as wood flour, asbestos, cellulose fibers or the like. However, it was found that glass fibers, when incorporated in predetermined amounts, did not materially inhibit flow and combined with the other ingredients in a manner unexpectedly to increase the strength of the final product. For example, a three to five fold increase in strength was secured merely by the incorporation of 4–6 percent by weight glass fibers in the molded product.

This application, which is a continuation-in-part of the aforementioned copending application, sets forth a further improvement in the manufacture of an inorganic molding composition in that it has been found that by the addition of a small amount of water, not only larger amounts of glass fiber reinforcement may be introduced but other fillers and substances of a beneficial nature may be compounded therein markedly to increase the strength and other characteristics of the final product. The amount of water incorporated should be held to a minimum, otherwise the strength properties of the final product will be materially lowered and mold release will be more difficult. It is preferred to make use of less than 12 percent by weight water based on the molding compound but better results will be secured when the amount of water added ranges from 2–7 percent by weight.

It has also been determined that although the water may be added to the dry substances, it is better to incorporate the water as a solution of the magnesium sulphate in amounts sufficient, for example, to make up a solution having a specific gravity ranging from 1.25–1.35 (about 20–30 percent solids). After the water has been added and incorporated with the other ingredients, the life of the molding composition is limited because reaction commences almost immediately between the magnesium oxide and magnesium sulphate components in the formation of a hardened cement. As a result, water addition should be made to the ingredients during the final stages of compounding but the life of the compound can be extended for several hours by refrigeration without harmfully affecting the flow properties of the molding material or the strength properties of the product molded therefrom. This time limitation is not present in the composition of my copending application because the ingredients are present in dry form so that reaction will not take place until moisture is developed under molding conditions.

Briefly described, invention herein resides in the preparation of a molding compound wherein a minimum amount of water, about 10 percent by weight or less, glass fibers and other additives, which will hereinafter be described in greater detail, are combined with magnesium oxide and magnesium sulphate, preferably in the form of a hydrated salt from which moisture can be made available to reduce the amount of water that need be added. The oxide and sulphate should be incorporated in proportion to react under molding conditions to form a set binder which appears to have the characteristics of a magnesium oxysulphate cement. It is preferred to combine the magnesium oxide and magnesium sulphate in the ratio of 3 molecular equivalents of the first to 1 molecular equivalent of the second (33 parts by weight MgO to 67 parts by weight $MgSO_4 \cdot 7H_2O$). Excellent results are secured when the materials are present in the ratio of 2–5 molecular equivalents of magnesium oxide to 1 molecular equivalent of the sulphate while it has been found possible to broaden the ratio from 1–9 molecular equivalents magnesium oxide to 1 molecular equivalent magnesium sulphate heptahydrate (14–60 parts by weight MgO to 84–40 parts by weight $MgSO_4 \cdot 7H_2O$).

Brucite calcined from the Luddington brine by The Dow Chemical Company of Midland, Michigan, or Sierra magnesia manufactured by F. E. Schundler & Co.

of Joliet, Illinois, have been very successfully used as the magnesium oxide component but there is reason to believe that other magnesium oxides can be used or that magnesium hydroxide from which one molecule of water can be eliminated during molding to form magnesia may also be used in the practice of this invention. In use, the magnesia is employed in powder form and mixed with the dry portion of the magnesium sulphate heptahydrate to minimize reaction in advance of molding.

It has been found that the presence of glass fibers of substantial lengths and in amounts ranging from 5–10 percent by weight in the molding compound causes the strength properties of the product molded therefrom to be at least three times greater than a corresponding molding composition without glass fibers. Increase of this magnitude with glass fibers in such small proportion is unusual compared with other instances of glass fiber reinforcement, indicating existence of a combination not previously obtained. For reinforcement purposes, it is preferred to make use of continuous strands of glass fibers formed of hundreds of sized glass filaments gathered together in bundles and cut or shaped to shorter lengths ranging from ¼–2 inches. Instead, discontinuous fibers cut or chopped to the desired lengths may be used or yarns formed of a plurality of discontinuous fibers felted together and then drafted into continuous lengths may also be used when cut or chopped into lengths which can be incorporated with the molding material. When it is possible to lay the basic molding composition in the mold cavity, the glass fibers may be incorporated as bonded mats or the like laid in with the molding composition. Glass fibers in amounts greater than 3 percent by weight impart increased strength and the upper limit is that which can be incorporated without reducing flow beyond that necessary for filling the mold, such as 15–20 percent. When sized fibers are used, it is preferred to use an alkyd type resin or a copolymer of styrene-butadiene size.

It has been found that further improvement in strength properties and a smoother and better appearing product will result if, in combination with the glass fiber reinforcement, a finely ground woody filler is used, such as wood flour, or the wood fiber derived from the bark of Douglas fir trees marketed by Weyerhaeuser Timber Company under the name Sylvacon. When such woody filler is used, the amount should not exceed 20 percent by weight of the molding composition and best results are secured with wood flour when the amount is less than 11 percent by weight. Still further improvement in appearance and smoothness of the surface is derived by the incorporation of additional fillers of the type Dicalite (diatomaceous earth), marble dust, potter's flint, glass wool sandings, asbestos fines and the like. It is preferred to use not more than 12 percent Dicalite because excess quantities tend to increase the water absorption and lower the strength properties of the final product. The marble dust tends to give improved smoothness and increased resistance to moisture absorption.

Further modification can be made by way of addition of small amounts of pigment to impart color or by the use of mineral oils, synthetic oils, waxes, gums, metal soaps, resins and citric acid to improve the finish, strength and moisture resistance of the final product. Ordinarily additions of th above are made in relatively small quantities which seldom exceed 5 percent by weight.

In compounding, it is preferred to prepare a gauging solution of the aqueous component and the portion of the magnesium sulphate to be dissolved therein and then add the gauging solution to the woody filler until all of the moisture is absorbed. The other fillers may simultaneously be added and homogenized by blending in a manner to prevent break-down of the glass fiber reinforcement. Magnesium oxide and the dry magnesium sulphate are separately mixed and then combined with the wetted filler immediately before molding or else the mixture may be refrigerated for several hours until molding is to take place.

Molding pressures of about 5000 pounds per square inch have been found to be most suitable for compositions of the type described. Less pressure can be used but the strength properties are gradually reduced and it has been found inadvisable to use pressures less than 1000 pounds per square inch. Where greater pressure can be made available, up to 25,000 pounds per square inch can be used. Ordinarily it is desirable to heat the molding compound to a temperature within a range of 160–200° F. in molding and for this purpose mold temperatures in the range of 200–230° F. may be used. Under these conditions, a satisfactory molding product can be secured almost instantaneously but it is preferred to maintain such molding conditions for about 2–10 minutes.

Without proper lubrication of the mold or the use of separators, difficulties are sometimes encountered in releasing the molded product from the mold form, especially if higher ranges of added water have been used in compounding. Where substantially flat products are to be molded, separator sheets of styrene bonded glass fiber mat may be used. For more intricate metal molds, lubricating compounds such as wax, castor oil, stearic acid and heavy metal soaps and the like may be used.

The advantages derived by the use of relatively small amounts of glass fiber can be illustrated from the following comparison of compounds prepared under substantially identical conditions.

*Example 1*

Composition without glass fibers:

26.1 parts magnesium oxide
    11.6 parts marble dust
    11.6 parts Dicalite
    10.9 parts wood flour (40 mesh)
    16.7 parts magnesium sulphate heptahydrate (40 mesh)
    15.1 parts gauging solution (1.29 specific gravity)

*Example 2*

Composition with glass fibers:

26.1 parts magnesium oxide
    11.6 parts marble dust
    11.6 parts Dicalite
    10.9 parts wood flour (40 mesh)
    16.7 parts magnesium sulphate heptahydrate (40 mesh)
    15.1 parts gauging solution (1.29 specific gravity)
    8.0 parts glass fibers in strand form cut to .45 inch In compounding each of the above compositions, the gauging solution was mixed with the marble dust, Dicalite, wood flour, and with the glass fibers (in the case of Example 2). The magnesium oxide and magnesium sulphate heptahydrate were separately mixed and then incorporated with the other substance prior to molding.

Test bars were molded under pressures of 5000 pounds per square inch with platen temperatures of 220° F. for 3 minutes. The dry flexure strength of bars molded of Example 1 was 15,000 pounds per square inch compared to values of 45,000 pounds per square inch for bars molded of the composition of Example 2. This represents an increase in strength beyond that which is normally expected from the incorporation of such small amounts of glass fibers in molding compositions of the present type.

*Example 3*

Dry mixture:

180 parts magnesium oxide
    80 parts potter's flint
    80 parts Dicalite
    125 parts Sylvacon 115 parts magnesium sulphate heptahydrate
55 parts glass fiber strands sized with alkyd resin and cut to ½ inch lengths Gauging solution:

80 parts magnesium sulphate solution, specific gravity 1.3 (26 percent MgSO4)

The dry mixture is combined in a paddle blender and the gauging solution added and worked into the mixture by a rubber mill or ribbon blender until a smooth putty-like consistency is obtained. The compound then may be refrigerated until molded. In molds heated to 200° F. and operating at a pressure of 1000–5000 pounds per square inch the material is loaded therein and molds closed until the temperature of the material rises to about 180–190° F. and then the molds are immediately opened.

Cups molded of the above composition in the manner described had compression strengths ranging from 1500–3000 pounds per square inch, dry flexure strengths of about 2500 pounds per square inch and they still retained high strengths after immersion in boiling water for more than one hour.

*Example 4*

24.3 parts magnesium oxide
10.8 parts potter's flint
10.0 parts wood flour
27.0 parts magnesium sulphate heptahydrate
7.5 parts glass fibers sized with alkyd resin and cut to ½ inch lengths The potter's flint and wood flour are mixed with 10 parts by weight water and the magnesium oxide and magnesium sulphate heptahydrate are separately mixed in powder form. The two mixtures are blended together and molded under 6000 pounds per square inch pressure in molds heated to 200–230° F. for a few minutes.

*Example 5*

24.3 parts magnesium oxide
10.8 parts marble dust
12.0 parts Dicalite
19.0 parts Sylvacon
15.6 parts magnesium sulphate heptahydrate (40 mesh)
14.1 parts magnesium sulphate solution, 1.3 specific gravity
8.3 parts glass fibers in the form of strands sized with butadiene-styrene copolymer and cut to ½ inch lengths A molding compound is prepared of the above in accordance with Example 1. The molded product has a flexure strength of 4700 pounds per square inch and a flexure modulus of about $4.7 \times 10^6$ pounds per square inch, compression strength of 9700 pounds per square inch, edge impact strength of 2.4 foot pounds per inch, face impact strength (unnotched) of 2.8 foot pounds per inch, water absorption of 2.9 percent and specific gravity of about 1.81.

*Example 6*

33 parts magnesium oxide
67 parts magnesium sulphate heptahydrate
10 parts glass fibers ¼ inch in length
10 parts wood flour
10 parts water

*Example 7*

30 parts magnesium oxide
66 parts magnesium sulphate heptahydrate
14 parts gauging solution, 26% magnesium sulphate
8.8 parts glass fibers of the staple type cut to ½ inch lengths
10.5 parts wood flour

*Example 8*

25 parts magnesium oxide
70 parts magnesium sulphate heptahydrate
20 parts gauging solution, 25% magnesium sulphate
17 parts glass fibers ranging in lengths from ⅛–2 inches Molding compositions are prepared in accordance with the foregoing examples and refrigerated until molding.

In all of the above examples the term "parts" is intended to cover parts by weight.

It will be evident from the foregoing that I have produced a new and improved inorganic molding compound which can be formulated of low cost readily available raw materials into a high strength product, which can be molded by conventional presses into intricate shapes for use in applications subject to high temperature, direct flame, or exposure to atmospheric conditions or for such uses as heat, sound or electrical insulation or as a structural material.

It will be understood that changes may be made in the compositions, method of compounding and molding without departing from the spirit of the invention, especially as defined in the following claims.

I claim:

1. An inorganic molding compound consisting essentially of magnesium oxide and magnesium sulphate heptahydrate present in the ratio of 1–9 molecular equivalents of the oxide to one molecular equivalent of the sulphate, 2 to 12 percent by weight of water, and glass fibers in amounts ranging from 3–15 percent by weight.

2. An inorganic molding compound consisting essentially of magnesium oxide and magnesium sulphate heptahydrate present in the ratio of 2–5 molecular equivalents of the oxide to one molecular equivalent of the sulphate, 2 to 12 percent by weight of water, and 3–15 percent by weight glass fibers in the form of bundles having a length ranging from ⅛–2 inches.

3. An inorganic molding compound consisting essentially of magnesium oxide and magnesium sulphate heptahydrate present in the ratio of 2–5 molecular equivalents of the oxide to one molecular equivalent of the sulphate, 2–7 percent by weight of water, and 5–10 percent by weight of glass fibers in the form of bundles having a length ranging from ⅛–2 inches.

4. An inorganic molding compound consisting essentially of magnesium oxide and magnesium sulphate heptahydrate present in the ratio of 2–5 molecular equivalents of magnesium oxide to one molecular equivalent of the sulphate, a solution of water in amounts ranging from 2–7 percent by weight with a part of the magnesium sulphate heptahydrate sufficient to make up a 20–30 percent solution, and 5–10 percent by weight glass fibers in the form of bundles having a length ranging from ⅛–2 inches.

5. A molding compound as claimed in claim 4 in which the glass fibers are sized with an alkyd resin.

6. An inorganic molding compound consisting essentially of magnesium oxide and magnesium sulphate heptahydrate present in the ratio of 1–9 molecular equivalents of the oxide to one molecular equivalent of the sulphate, 2 to 12 percent by weight of water 3–10 percent by weight of glass fibers in the form of bundles having a length ranging from ⅛–2 inches wood fiber filler present in an amount up to 20% by weight to improve the finish and appearance of the molded product.

7. An inorganic molding compound consisting essentially of magnesium oxide and magnesium sulphate heptahydrate present in the ratio of 2–5 molecular equivalents of the oxide to one molecular equivalent of the sulphate, 2–7 percent by weight of water in the form of a gauging solution made up with sufficient of the magnesium sulphate to a specific gravity of 1.25–1.35, less than 11 percent by weight of wood flour, and 3–10 percent by weight of glass fibers in the form of bundles having a length ranging from ⅛–2 inches.

8. An inorganic molding compound consisting essentially of magnesium oxide and magnesium sulphate heptahydrate present in the ratio of 2–5 molecular equivalents of the oxide to one molecular equivalent of the sulphate, 2–7 percent by weight of water in the form of a gauging solution made up with sufficient of the magnesium sulphate to a specific gravity of 1.25–1.35, fiber derived from the bark of Douglas fir trees and present in an amount up to 20% by weight to improve the smoothness and appearance of the product molded therefrom, and 3–10 percent by weight of glass fibers in the form of bundles having a length ranging from 1/8–2 inches.

9. An inorganic molding compound consisting essentially of magnesium oxide and magnesium sulphate heptahydrate present in the ratio of 1–9 molecular equivalents of the oxide to one molecular equivalent of the sulphate, 2 to 12 percent by weight of water, 3–10 percent by weight of glass fibers in the form of bundles having a length ranging from 1/8–2 inches, wood fiber filler and present in an amount up to 11% by weight to improve the smoothness and appearance of the product molded therefrom, and an inorganic filler selected from the group consisting of diatomaceous earth, marble dust, glass wool sandings, potter's flint and asbestos fines.

10. The method of preparing inorganic molded products comprising the steps of separately mixing magnesium oxide and magnesium sulphate heptahydrate in finely divided form in the ratio of 1–9 molecular equivalents of the oxide to one of the sulphate, incorporating 3–10 percent by weight of glass fibers in the form of bundles having a length ranging from 1/8–2 inches and 2 to 12 percent by weight of water, molding the compound soon after the water is added at a temperature ranging from 160–200° F. and a pressure ranging from 1000–5000 pounds per square inch.

11. The method of preparing inorganic molded products comprising the steps of separately mixing magnesium oxide and magnesium sulphate heptahydrate in the ratio of 2–5 molecular equivalents of the oxide to one of the sulphate, separately mixing water in amounts ranging from 2–7 percent by weight of the total compound in the form of a gauging solution in which sufficient of the magnesium sulphate heptahydrate is dissolved to make a 20–30 percent solution, 3–10 percent glass fibers in the form of bundles having a length ranging from 1/8–2 inches and wood flour and present in an amount up to 11% by weight to improve the smoothness and appearance of the product molded therefrom, combining the two mixtures, and then molding the composition that is formed at a temperature ranging from 160–200° F. and a pressure ranging from 1000–5000 pounds per square inch.

12. The method of preparing inorganic molded products comprising the steps of separately mixing magnesium oxide and magnesium sulphate heptahydrate in the ratio of 2–5 molecular equivalents of the oxide to one molecular equivalent of the sulphate, separately mixing 2–7 percent by weight of the total mixture of water, 3–10 percent by weight of glass fibers in the form of bundles having a length ranging from 1/8–2 inches, wood fiber filler and present in an amount up to 11% by weight to improve the smoothness and appearance of the product molded therefrom and a filler selected from the group consisting of diatomaceous earth, marble dust, glass wool sandings, potter's flint and asbestos fines and present in an amount up to 12% by weight, combining the mixture of wetted fillers with the mixture of the sulphate and oxide and then molding the composition at a temperature ranging from 160–200° F. and a pressure ranging from 1000–5000 pounds per square inch.

13. An inorganic molding compound consisting essentially of magnesium oxide and magnesium sulfate having combined water of crystallization present in the ratio of 1–9 molecular equivalents of the oxide to 1 molecular equivalent of the sulfate, 2–12% by weight of water plus an amount of water corresponding to the difference in the amount of combined water in the magnesium sulfate used as compared to the amount of combined water in an equivalent amount of magnesium sulfate heptahydrate, and glass fibers in amounts ranging from 3–15% by weight.

14. An inorganic molding compound consisting essentially of magnesium oxide and magnesium sulfate having combined water of crystallization and present in the ratio of 1–9 molecular equivalents of the oxide to 1 molecular equivalent of the sulfate, 2–12% by weight of water plus an amount of water corresponding to the difference in the amount of combined water in the magnesium sulfate used as compared to the amount of combined water in an equivalent amount of magnesium sulfate heptahydrate, 3–10% by weight of glass fibers, and a wood fiber filler present in an amount up to 20% by weight to improve the smoothness and appearance of the product molded therefrom.

15. An inorganic molding compound consisting essentially of magnesium oxide and magnesium sulfate having combined water of crystallization and present in the ratio of 1–9 molecular equivalents of the oxide to 1 molecular equivalent of the sulfate, 2–12% by weight of water plus an amount of water corresponding to the difference in the amount of combined water in the magnesium sulfate used as compared to the amount of combined water in an equivalent amount of magnesium sulfate heptahydrate, 3–10% by weight of glass fibers in the form of bundles having a length ranging from 1/8 to 2 inches, wood fiber filler present in an amount up to 11% by weight to improve the smoothness and appearance of the product molded therefrom, and an inorganic filler selected from the group consisting of diatomaceous earth, marble dust, glass wool sandings, potter's flint and asbestos fines and present in an amount up to 12% by weight to improve the smoothness and appearance of the product molded therefrom.

References Cited in the file of this patent

UNITED STATES PATENTS

| Number | Name | Date |
|---|---|---|
| 126,049 | Hahn | Apr. 23, 1872 |
| 872,375 | Rueff | Dec. 3, 1907 |
| 909,171 | Ellis | Jan. 12, 1909 |
| 1,720,972 | Seaton | Apr. 15, 1925 |
| 2,130,091 | Kershaw | Sept. 13, 1938 |
| 2,175,715 | Denning | Oct. 10, 1939 |
| 2,425,883 | Jackson | Aug. 19, 1947 |
| 2,509,599 | Hollenberg | May 30, 1950 |
| 2,526,066 | Croce | Oct. 17, 1950 |
| 2,543,752 | Austin et al. | Mar. 6, 1951 |
| 2,572,688 | Austin | Oct. 23, 1951 |
| 2,598,102 | Baxter | May 27, 1952 |
| 2,602,037 | Nelb | July 1, 1952 |
| 2,628,915 | Austin et al. | Feb. 17, 1953 |
| 2,703,762 | Slayter | Mar. 8, 1955 |
| 2,712,512 | Biefeld | July 5, 1955 |

FOREIGN PATENTS

| Number | Country | Date |
|---|---|---|
| 4,223 | Great Britain | Apr. 28, 1894 |
| 497,621 | Great Britain | Dec. 22, 1938 |